(12) United States Patent
Hammer et al.

(10) Patent No.: US 6,251,449 B1
(45) Date of Patent: *Jun. 26, 2001

(54) CELLULOSE-HYDRATE-BASED FOOD CASINGS IMPREGNATED WITH LIQUID SMOKE AND PROCESS FOR PRODUCING

(75) Inventors: Klaus-Dieter Hammer; Leo Mans, both of Mainz (DE)

(73) Assignee: Hoechst Aktiengesellschaft, Frankfurt am Main (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/892,156

(22) Filed: Jul. 14, 1997

Related U.S. Application Data

(63) Continuation of application No. 08/524,909, filed on Sep. 7, 1995, now abandoned.

(30) Foreign Application Priority Data

Sep. 8, 1994 (DE) .............................. P 44 31 992

(51) Int. Cl.$^7$ .............................. A22C 13/00; A23L 1/317
(52) U.S. Cl. .......................... 426/105; 426/135; 426/262; 428/34.8
(58) Field of Search .................................. 426/105, 135, 426/262; 138/118.1; 428/34.8

(56) References Cited

U.S. PATENT DOCUMENTS

| | | | |
|---|---|---|---|
| 4,104,408 | 8/1978 | Chiu | 426/135 |
| 4,377,187 | 3/1983 | Chiu | 138/118.1 |
| 4,442,868 | 4/1984 | Smith et al. | 138/118.1 |
| 4,446,167 | 5/1984 | Smith et al. | 426/650 |
| 4,834,993 | 5/1989 | Chiu | 426/250 |
| 5,096,754 | 3/1992 | Hammer et al. | 428/34.8 |
| 5,230,933 | * 7/1993 | Apfeld et al. | 426/135 X |
| 5,262,211 | 11/1993 | Hammer et al. | 428/34.8 |

FOREIGN PATENT DOCUMENTS

| | | |
|---|---|---|
| 2090925 | * 9/1993 | (CA) . |
| 1 099 326 | 2/1963 | (DE) . |
| 1 692 197 | 7/1971 | (DE) . |
| 28 13 796 | 10/1978 | (DE) . |
| 0 095 616 | 12/1983 | (EP) . |
| 0 315 965 | 5/1989 | (EP) . |
| 0 378 069 | 7/1990 | (EP) . |
| 0 460 348 | 12/1991 | (EP) . |
| 0 468 284 | 1/1992 | (EP) . |
| 0 559 084 | 9/1993 | (EP) . |
| 1086604 | 10/1967 | (GB) . |
| 2 020 157 | 11/1979 | (GB) . |

OTHER PUBLICATIONS

Chemical Abstracts, vol. 92, No. 17, pp. 461–462, Apr. 1980.

* cited by examiner

*Primary Examiner*—Arthur L. Corbin
(74) *Attorney, Agent, or Firm*—Foley & Lardner

(57) ABSTRACT

A cellulose-hydrate-based food casing impregnated on its inside with liquid smoke which has a pH of about 2 to less than 4 and additionally contains a viscosity-increasing compound, an emulsifier and a triglyceride or lecithin.

21 Claims, No Drawings

CELLULOSE-HYDRATE-BASED FOOD CASINGS IMPREGNATED WITH LIQUID SMOKE AND PROCESS FOR PRODUCING

This application is a continuation, of application Ser. No. 08/524,909, filed Sep. 7, 1995, now abandoned.

BACKGROUND OF THE INVENTION

1. Field of the Invention

The invention relates to a tubular cellulose-hydrate-based food casing, the inside of which is impregnated with liquid smoke. The casings are particularly suitable for encasing meat products such as sausage and ham. The invention further relates to processes for producing these food casings and to methods of their use.

2. Description of Related Art

Tubular cellulose-hydrate-based food casings have long been known. Such casings are usually produced by the viscose process. In this process, an alkaline solution of cellulose xanthogenate, generally termed a viscose solution, is extruded through a tubular or slot die, coagulated as cellulose hydrate gel using an acidic liquid, and regenerated to give cellulose hydrate. The unreinforced cellulose hydrate material thus produced is also termed transparent cellulose hydrate film and is known under the trade mark Cellophane®. In the production of fiber-reinforced casings, a tubular or web-shaped fibrous material is impinged with the viscose solution and then treated in a corresponding manner with coagulation liquid and regeneration liquid.

Food casings, even after relatively long storage times, must still be pliable and sufficiently extensible. Attempts have been made to improve these properties by addition of secondary softeners, such as glycerol. Since these softeners are not chemically bound to the cellulose hydrate but are only bound by intermolecular forces, they are leached out when the casing is soaked or when the sausage is scalded or cooked. This causes a particularly intense embrittlement of the softener-free dried cellulose casing after the processing. This phenomenon is due to crystallization proceeding in the cellulose material, leading to development of hydrogen bonding between the individual cellulose molecules in the cellulose structure and thus to convergence and spatial fixation. As a result of this structural change, the casing becomes particularly sensitive to impact and frequently tears over the entire length on first incision. According to EP-A 0 460 348, glycerol-free sausage casings which are produced with a mixture of cellulose and alginic acid and/or alginate, in contrast, show markedly improved properties.

Food casings must take the most varied requirements into account. They serve equally as a container during the processing of the product and as a protective casing for the finished product. However, appearance and flavor of the foods are decisive for sales. This particularly applies to smoked meat products. There is a trend to replace traditional smoking by the use of so-called "liquid smoke solutions" which have been developed by the food industry. These solutions have previously been incorporated into the meat mixture or sausage mixture or sprayed thereon. Because of the frequently uneven smoked color on the surface of the product and the deficient aroma, other methods have been sought. Thus attempts have been made to apply the liquid smoke solution onto the inner or outer surface of the food casings and thus to achieve the desired smoked color and the aroma being transferred to the filling.

According to DE-A 10 99 326, sausage casings made of regenerated cellulose are exposed during or after the drying process to the action of smoke which was generated by combustion of wood to a greater or lesser extent. The smoke produces resistance to the destructive action of microorganisms. The time of action is reduced if the cellulose tube is impregnated from the outside with the condensates produced from the wood smoke in concentrated or dilute form.

Liquid smoke, as obtained by introducing wood smoke into water, is acidic and can therefore damage the cellulose hydrate sausage casing. Such an acidic liquid smoke having a total acid content of at least 6% by weight, preferably at least 9% by weight, is disclosed in U.S. Pat. No. 4,377,187. A relatively high acid content denotes here a relatively high content of tar-like constituents. The inner or outer surface of the cellulose casings is impregnated by this liquid smoke.

In order to avoid damage to the cellulose, according to U.S. Pat. No. 4,834,993, the outer surface of cellulose-based sausage casings is treated with a neutralized liquid smoke which has a pH of greater than 4, preferably 5 to 9. In order to enable the diffusion of high-molecular constituents through the sausage casing, the neutralized liquid smoke can also contain a short-chain alcohol. However, in the neutralization of the liquid smoke, solid constituents generally precipitate out. In order to prevent this, at least 10% by weight of a water-soluble alcohol, such as ethanol, glycerol, propylene glycol or triethylene glycol, were added to the aqueous liquid smoke solution (See DE-A 28 13 796 equivalent to U.S. Pat. No. 4,104,408). The tar-like constituents precipitating out during neutralization redissolve if the pH of the liquid smoke solution is increased to greater than 10 (U.S. Pat. No. 4,446,167).

The alkaline liquid smoke solution can additionally further contain up to 10% by weight of glycerol and/or propylene glycol as softener for the sausage casing. In order to improve the peelability of the casing, the liquid smoke solution can further contain 0.5 to 2% by weight of carboxymethylcellulose, alginate, dextrin, amylopectin or other substances usual for this purpose (See U.S. Pat. No. 4,442,868). These substances can also be applied to the casing before the treatment with liquid smoke.

The tar-like constituents can be removed from the acidic liquid smoke by extraction with organic solvents. The color-imparting constituents of the smoke remain in the aqueous phase. Before further use, the aqueous phase is adjusted to a pH of 6 to 8 by addition of alkaline neutralizing agents. The same result is achieved if the acidic liquid smoke is neutralized and the tar-like constituents which precipitate out during this are separated off. A liquid smoke produced in this way is stable at neutral pH even without addition of alcohols or other additives (See EP-A 0 095 616). However, it has only a little smoke flavor, or none at all, so that the aroma must be transferred to the filling in another way.

SUMMARY OF THE INVENTION

It is therefore the object of the invention to provide a cellulose-hydrate-based food casing which can uniformly and intensively transfer smoked color and smoked aroma to the food.

It is also an object of the invention to provide a method of providing such a casing and methods of using such casing.

It is also an object of the invention to provide a liquid smoke composition useful in coating casings.

These objects are achieved in one aspect of the invention by providing a cellulose-hydrate-based food casing which is impregnated on its inside with liquid smoke, wherein the liquid smoke used for the impregnation has a pH of about 2 to less than 4 and additionally contains a viscosity-increasing compound and an emulsifier.

In accordance with another aspect of the invention, there is provided a process for producing a cellulose-hydrate-based food casing impregnated with liquid smoke, which comprises moistening with water a cellulose hydrate tube having a water content of 8 to 12% by weight, impregnating the tube on the inside using a liquid smoke which has a pH of about 2 to less than 4 and comprises a viscosity-increasing compound and an emulsifier and then drying the tube to a water content of 25 to 35% by weight.

In accordance with another aspect of the invention, there is provided a foodstuff, such as cooked ham or scalded sausage encased with a food casing as described above.

In accordance with another aspect of the invention, there is provided a liquid smoke composition having a pH of about 2 to less than 4 which comprises a viscosity-increasing compound and an emulsifier.

Further objects, features and advantages of the invention will become apparent from the detailed description of preferred embodiments that follows.

DETAILED DESCRIPTION OF THE PREFERRED EMBODIMENTS

The liquid smoke used in the present invention includes a viscosity-increasing compound and an emulsifier.

The viscosity-increasing compound may be any which increases the viscosity of the liquid smoke, and is preferably chitosan (which is N-deacetylated chitin), a polysaccharide, polyvinylpyrrolidone, a starch derivative, or a cellulose derivative. The starch derivative or cellulose derivative in general is an ether or ester of starch or cellulose. Of the polysaccharides and the starch derivatives and cellulose derivatives, only those are suitable which do not become insoluble in the acidic medium. The polysaccharides here are also intended to include the heteropolysaccharides; these are polysaccharides which are made up of different monosaccharide units. Thus although alginic acid is a heteropolysaccharide, it is not suitable here since it is insoluble in the acidic liquid smoke and would precipitate out. For the same reasons, methyl cellulose is suitable, but carboxymethylcellulose, on the other hand, is not. The content of the viscosity-increasing compound is chosen to give the intended viscosity-increasing effect and is generally about 0.5 to 3% by weight, preferably 1.5 to 2.5% by weight, in each case based on the weight of the liquid smoke. The compound generally increases the viscosity of the liquid smoke to 10 to 40 s (Ford cup 4). The surface tension of the liquid smoke is preferably 30 to 40 mN/m.

The emulsifier can be ionic or nonionic. Any such emulsifier or mixture thereof which provides the desired emulsifying effect can be used. Preferred ionic emulsifiers include alkyl- or alkylarylsulfonates or alkyl or alkylaryl sulfates. Preferred nonionic emulsifiers include ethoxylated unbranched or branched ($C_6$–$C_{20}$)-alkanols and ethoxylated sorbitan monooleate. The content of the emulsifier is selected to give the desired emulsifying effect and is generally about 0.5 to 15% by weight, preferably 1 to 5% by weight, in each case based on the total weight of the liquid smoke.

The acidic liquid smoke used to produce the food casings according to the invention preferably has a pH of 2.5 to 3. The pH relates to the entire liquid smoke composition, i.e., including the viscosity-increasing compound and the emulsifier. Any known liquid smoke compositions can be used. It preferably contains all of the constituents of the original wood smoke, i.e., the tar-like constituents are not separated off. The total acid content (determined as described in U.S. Pat. No. 4,377,187 hereby incorporated by reference) in this liquid smoke is generally 3 to less than 6% by weight. Preferably, neither alcohols nor chelating agents or reducing agents are added to the liquid smoke. The liquid smoke virtually remains as obtained by combustion or low-temperature carbonization of wood and introduction of the smoke into water, to which is preferably only added the viscosity-increasing compound and the emulsifier and, if appropriate, in small amounts other customary additives, in particular colorants. Surprisingly, the food casings according to the invention transfer smoked flavor, smoked color and smoked odor in an unadulterated form and significantly more intensively to the filling than the known casings impregnated with neutralized liquid smoke.

The cellulose-based food casings to be impregnated with the acidic liquid smoke may be any cellulose-based casing known in the art. Expediently the casings contain no more than 10% by weight of glycerol, based on the total weight of the casing, since glycerol decreases the absorption capacity for the liquid smoke and impairs the transfer of color and aroma to the food enclosed by the casing. A particularly preferred starting material for the production of the food casings according to the invention is therefore a glycerol-free, fiber-reinforced cellulose base material which contains alginic acid or alginate.

Alginic acids are, as is known, carboxyl-group-containing plant polysaccharides. Alginates are the salts of alginic acids, preferably the alkali metal, ammonium, and/or alkaline earth metal salts. Sodium alginate is usually produced by extraction of brown algae using soda solution. Alginates and alginic acids comprise 1,4-β-glycosidically linked D-mannuronic acid units with insertions of 1,4-α-glycosidically linked L-guluronic acid units. They are made up in a similar manner to cellulose from long unbranched chain molecules. Owing to the large number of carboxyl groups, the alginates and alginic acids are extraordinarily hydrophilic and able to bind 200 to 300 times their weight of water. The base material is preferably fiber-reinforced, particularly, preferably with hemp fibers.

The food casing according to the invention not only transfers color and aroma more intensively and more uniformly than those known hitherto; the casing may moreover still easily be peeled off from the filling, in particular from cooked ham and scalded sausage.

The absorption and especially the transfer of the oil-soluble, coloring constituents may be further improved if a natural or synthetic triglyceride is added to the liquid smoke. Any such compounds can be used. Those which are expedient include olive oil, sunflower oil and synthetic triesters of glycerol and ($C_8$–$C_{10}$) fatty acids (e.g., Softenol® 3108 from Dynamit Nobel). Particular preference is given to lecithin, because it is taken up by the cellulose and at the same time produces a good release effect. The content of the triglyceride is an amount effective to impart desired transfer properties, and is generally about 2 to 30% by weight, preferably 5 to 15% by weight, in each case based on the total weight of the liquid smoke.

The liquid-smoke-impregnated food casings according to the invention are generally stuffed without a preceding soaking. Since the casings have a relatively high moisture content, a fungicidal external coating, such as is described, for example, in EP-A 0 378 069 (equivalent to U.S. Pat. No. 5,262,211) which are both incorporated by reference herein, is advantageous.

The food casing according to the invention may be produced in any desired manner and is expediently produced by first moistening with water in an impregnating bath a cellulose hydrate tube having a water content of 8 to 12% by weight, based on the weight of the dry cellulose. The inside of the tube is then impregnated with the above described liquid smoke solution. After passing it through a squeezing roll, the tube (inflated or flat) is dried to a final moisture content of 25 to 35% by weight, based on the weight of the dry cellulose. It can then be shirred or tied off in sections at one end. This production process may be carried out using conventional equipment.

The food casing according to the invention can, if appropriate, contain conventional additives, such as color pigments, including carbon black and/or titanium dioxide.

The casings are impregnated with the liquid smoke in an amount to give the desired flavor and aroma. In general, the liquid smoke is applied in an amount of 20 to 100 g/m$^2$, preferably of 30 to 80 g/m$^2$, of casing surface. For example, food casings which are intended for boiled ham are generally impregnated with 60 to 80 g of liquid smoke per square meter of casing. For ham, the addition of a preferably brown food colorant is also advisable. The flavor may, if appropriate, be still further enhanced by the addition of a flavor enhancer based on glutamate, such as Supraglut®, Smak®, Smak® 'S' or Mat®. The flavor enhancer content is generally 0.1 to 0.6% by weight, preferably 0.2 to 0.4% by weight, in each case based on the total weight of the liquid smoke. Food casings for bologna (meat-sausage-like scalded sausage), are advantageously impregnated with a liquid smoke diluted 1:1 with water. In this case the application rate is generally about 30 to 40 g/m$^2$.

EXAMPLE

The invention is further described with reference to the following examples; the examples are for illustrative purposes only and do not limit the invention. The following liquid smoke solutions A, B and C were prepared:

| Solution A | |
|---|---|
| 250 ml | of liquid smoke (Hickory Supreme ® of Red Arrow Products Co., Manitowoc, Wisconsin, U.S.A. |
| 600 ml | of a 0.1% strength by weight aqueous solution of a heteropolysaccharide (Rhodigel ® 23), |
| 75 ml | of lecithin, |
| 50 ml | of a polyoxyethylene (20) sorbitan monooleate (Tween ® 80), |
| 25 ml | of an ethoxylated isotridecanol (on average 8 ethylene oxide units, Genapol ® X 080). |

This solution had a pH of 2.7, a viscosity of 15.6 s and a surface tension of 32.9 mN/m.

| Solution B | |
|---|---|
| 20 l | of liquid smoke Charsol Supreme Hickory ® from Red Arrow products Co., |
| 24 l | of a 0.2% strength by weight aqueous solution of a heteropolysaccharide (Rhodigel ® 23), |
| 24 l | of a 0.66% strength by weight aqueous solution of chocolate brown No. 67775, |
| 6 l | of lecithin, |
| 4 l | of Tween ® 80, |
| 2 l | of Genapol ® X 080. |

This solution is identical to Solution A, but additionally contains 2 g (0.2% by weight) of colorant 78 470 (permitted by the U.S. Food and Drug Administration).

Solutions A and C were used for impregnation on a laboratory scale and solution B, on the other hand, was used on an industrial scale.

A few drops of a defoamer were further added to the liquid smoke solutions.

These liquid smoke solutions were used to impregnate cellulose-fibrous skin casings, glossy (FDN) smoke colored, having a diameter of 120 mm (=caliber 120), which contained 10% by weight of glycerol and 5% by weight of alginate, in each case based on the weight of the dry cellulose, and had been externally fungicidally treated with a 1% strength by weight aqueous didecyldimethylammonium sorbate solution.

The casing thus obtained, without additional soaking, was filled with cooked ham and cooked. Samples thereof were then evaluated by four people in a blind test for depth of color, odor, and flavor.

For comparison, samples were also evaluated in the test which had been produced using the above-mentioned fibrous skin casing, but without smoke impregnation. In addition, samples were also used which had been produced using a cellulose hydrate sausage casing which had been impregnated with an alkaline liquid smoke solution. This solution likewise still contained the tar constituents.

In the same manner a glycerol-free cellulose fibrous skin was also impregnated with the above-mentioned liquid smoke solutions A to C, filled with cooked ham, and cooked. This glycerol-free fibrous skin had been produced as follows:

A 17 g hemp fiber paper was shaped to form a tube of caliber 58 and was coated externally with a mixture of 111 l/h of viscose and 11 l/h of a 4% strength by weight aqueous alginate solution (Protacell® 20 from Protan). The tube was then passed through the conventional spinning, precipitation and washing vats. It was then inflated with air and dried to a moisture content of 14 to 16% by weight. The content of alginate based on the weight of the cellulose hydrate was 5% by weight. The swelling index was 110%, the bursting pressure (after soaking) was 82 kPa (the nominal value: 76 kPa) and the static extension was 61.3 mm at 21 kPa (tolerance range: 59.7 to 62.7 mm).

It was shown that the food casings according to the invention yielded products having improved flavor and improved aroma and more uniform color and were preferred over the comparison samples by the testers in the blind test.

Other embodiments of the invention will be apparent to those skilled in the art from consideration of the specification and practice of the invention disclosed herein.

What is claimed is:

1. A cellulose-hydrate-based food casing impregnated on its inside with a liquid smoke composition, wherein the liquid smoke composition has a pH of about 2 to less than 4 and consists essentially of a liquid smoke which contains all of the constituents of wood smoke,
    a viscosity-increasing compound selected from the group consisting of chitosan, a polysaccharide, polyvinylpyrrolidone, a starch derivative and a cellulose derivative, wherein the polysaccharide, starch derivative and cellulose derivative do not become insoluble in the liquid smoke composition,
    an emulsifier, and
    a natural or synthetic triglyceride or lecithin.

2. A food casing as claimed in claim 1, wherein the viscosity-increasing compound comprises one or more of chitosan, a polysaccharide, a starch derivative, or a cellulose derivative.

3. A food casing as claimed in claim 1, wherein the content of the viscosity-increasing compound is 0.5 to 3% by weight based on the weight of the liquid smoke composition.

4. A food casing as claimed in claim 3, wherein the content of the viscosity-increasing compound is 1.5 to 2.5% by weight based on the weight of the liquid smoke composition.

5. A food casing as claimed in claim 1, wherein the emulsifier comprises an ionic emulsifier.

6. A food casing as claimed in claim 5, wherein the emulsifier is selected from one or more of an alkyl- or alkylarylsulfonate or an alkyl or alkyl-aryl sulfate.

7. A food casing as claimed in claim 1, wherein the emulsifier comprises a nonionic emulsifier.

8. A food casing as claimed in claim 7, wherein the emulsifier comprises an ethoxylated unbranched or branched ($C_6$–$C_{20}$) alkanol.

9. A food casing as claimed in claim 1, wherein the content of the emulsifier is 0.5 to 15% by weight based on the total weight of the liquid smoke composition.

10. A food casing as claimed in claim 1, wherein the content of the emulsifier is 1 to 5% by weight based on the total weight of the liquid smoke composition.

11. The food casing as claimed in claim 1, wherein the liquid smoke contains a natural or synthetic triglyceride.

12. A food casing as claimed in claim 11, wherein the triglyceride comprises one or more of olive oil, sunflower oil, and a synthetic triester of glycerol and a ($C_8$–$C_{10}$) fatty acid.

13. A food casing as claimed in claim 11, wherein the content of the triglyceride is 2 to 30% by weight based on the total weight of the liquid smoke composition.

14. A food casing as claimed in claim 13, wherein the content of the triglyceride is 5 to 15% by weight based on the total weight of the liquid smoke composition.

15. A food casing as claimed in claim 1, wherein the liquid smoke composition has a pH of 2.5 to 3.

16. A food casing as claimed in claim 1, wherein the cellulose-based material is glycerol-free and comprises one or more of alginic acid or alginate.

17. Foodstuff encased with a casing as claimed in claim 1.

18. Cooked ham or scalded sausage encased with a food casing as claimed in claim 1.

19. A food casing as claimed in claim 1, wherein the liquid smoke includes tar-like constituents.

20. A food casing as claimed in claim 1, which is produced by a process, which comprises moistening with water a cellulose hydrate tube having a water content of 8 to 12% by weight, impregnating the tube on the inside using a liquid smoke composition which has a pH of about 2 to less than 4 and consists essentially of a liquid smoke, which contains all of the constituents of the original wood smoke, a viscosity-increasing compound selected from the group consisting of chitosan, a polysaccharide, polyvinylpyrrolidone, a starch derivative, and a cellulose derivative, wherein the polysaccharide, starch derivative, and cellulose derivative do not become insoluble in the liquid smoke composition, an emulsifier, and a natural or synthetic triglyceride or lecithin, and drying the tube to a water content of 25 to 35% by weight.

21. A process for producing a cellulose-hydrate based food casing impregnated with liquid smoke composition according to claim 1, which comprises moistening with water a cellulose hydrate tube having a water content of 8 to 12% by weight, impregnating the tube on the inside using a liquid smoke composition which has a pH of about 2 to less than 4 and consists essentially of a liquid smoke, which contains all of the constituents of wood smoke, a viscosity-increasing compound selected from the group consisting of chitosan, a polysaccharide, polyvinylpyrrolidone, a starch derivative, and a cellulose derivative, wherein the polysaccharide, starch derivative, and cellulose derivative do not become insoluble in the liquid smoke composition, an emulsifier, and a natural or synthetic triglyceride or lecithin, and drying the tube to a water content of 25 to 35% by weight.

* * * * *